Feb. 5, 1935.  G. A. CREETH ET AL  1,989,917
WASHING MACHINE
Filed Sept. 29, 1930  2 Sheets-Sheet 2
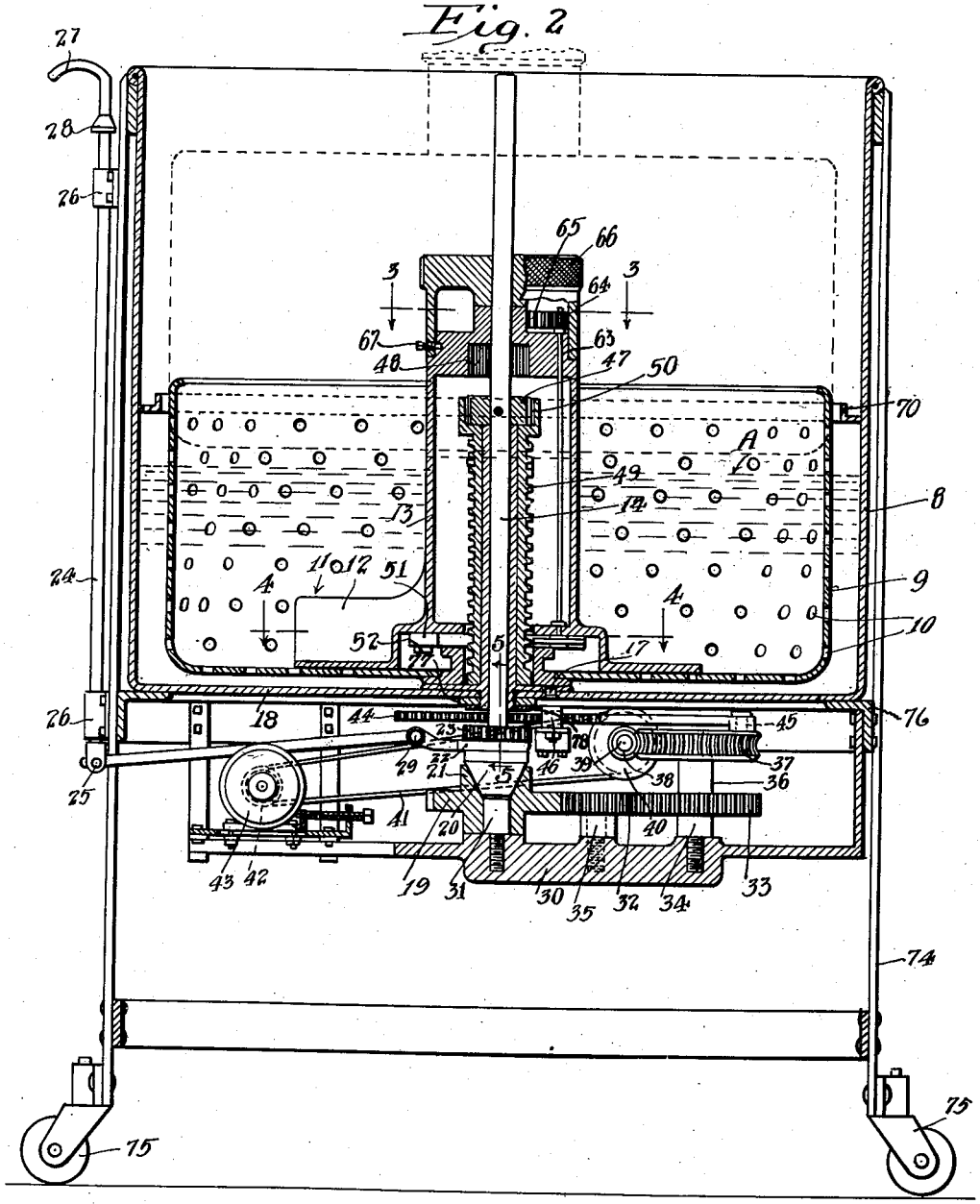
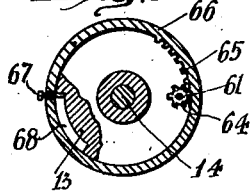
Inventors
George A. Creeth
Lester P. Philp
Walter A. Lindsay
By Lyon & Lyon
Attorneys Patented Feb. 5, 1935

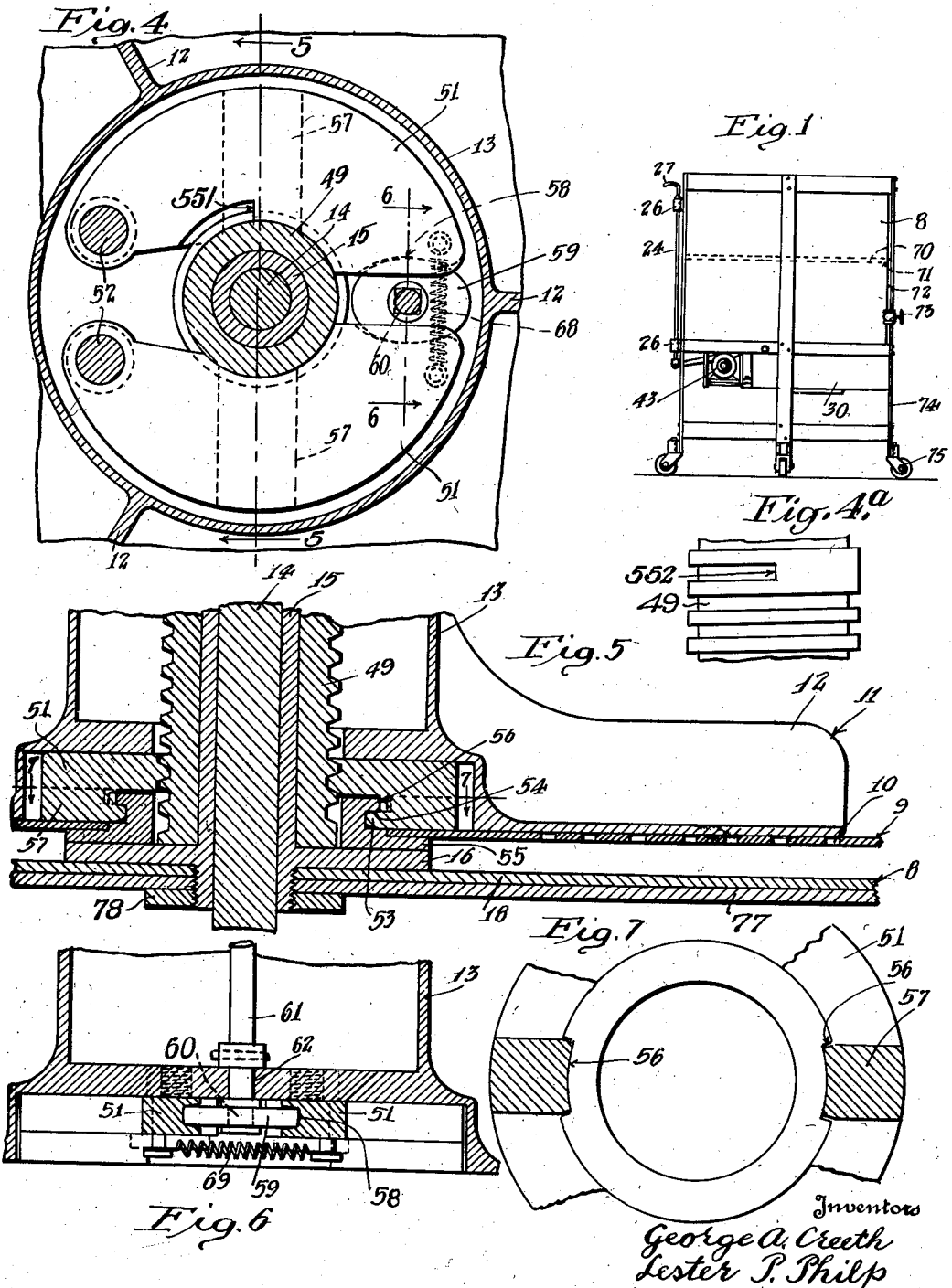

1,989,917

UNITED STATES PATENT OFFICE 1,989,917

WASHING MACHINE

George A. Creeth, Glendale, and Lester P. Philp and Walter A. Lindsay, Los Angeles, Calif.

Application September 29, 1930, Serial No. 485,054

8 Claims. (Cl. 68—15)

This invention relates to washing machines of the type employed for agitating articles in a liquid and separating the liquid from said articles.

The invention is a variation from the construction disclosed in the copending application of George A. Creeth, Lester P. Philp and Walter A. Lindsay, filed February 25, 1930, Serial Number 431,090.

An important object of this invention, in common with one of the objects of the invention disclosed in said copending application, is the elevation of the articles above the liquid body in which agitation takes place, and the subjection of said articles, while raised, to centrifugal action in order to separate from said articles liquid that is on or in them when raised out of the bath.

In the above mentioned copending application, raising of the basket and agitator and rotation of the basket is accomplished by a nut, which is connected with the basket and works on a vertical screw. Thus, when the basket rotates, the only driving force on the agitator is through the contents of the basket and, consequently, there may be slippage between the basket and the articles therein. In the present invention, the nut is secured to the agitator and is engageable with the basket and with the thread of a vertical screw and, accordingly, upward movement of the nut effects raising of the agitator and basket and rotation of the nut when its sections engage the screw, effects rotation of the agitator and, accordingly, the articles in the basket will be whirled around at the speed of the screw.

Another object of this invention is the provision of a different mechanism than disclosed in said copending application, for operating the sections of the nut to and from engagement with the screw, whereby up and down movements of the agitator and basket are produced.

Another object is to effect closing and opening of the nut sections by mechanism positioned within the basket.

Further objects and advantages will appear in the subjoined detailed description.

The accompanying drawings illustrate the invention:

Figure 1 is a side elevation of a machine constructed in accordance with the provisions of this invention.

Figure 2 is an enlarged vertical sectional view of the machine.

Figure 3 is a fragmental plan section on the line indicated by 3—3, Fig. 2.

Figure 4 is an enlarged fragmental plan section, the plane of section being indicated by the line 4—4, Fig. 2.

Figure 4a is a detail elevational view of the upper portion of the screw for raising the basket.

Figure 5 is a fragmental vertical section, the plane of section being indicated by the line 5—5, Fig. 4.

Figure 6 is a fragmental vertical view, partly in section, looking from the line indicated by 6—6, Fig. 4.

Figure 7 is a broken plan view, partly in section, from the line indicated by 7—7, Fig. 5.

There is provided a tank 8 adapted to hold the liquid bath A, and there is rotatably mounted within the tank 8 a basket 9 adapted to contain the articles that are to be immersed in the bath, the basket being perforate or provided with openings 10 through which the liquid can readily enter and leave the basket.

Within the basket 9 is an agitator 11 which may comprise any desired number of vertically arranged blades 12 projecting radially from a central vertical sleeve 13 that constitutes the stem of the agitator. The stem 13 surrounds a vertical spindle 14 which is rotatably mounted in a bearing 15 that extends from the bottom of the tank approximately halfway to the top of said tank. The lower end of the bearing 15 is provided with a flange 16 which is secured by fastening devices 17 to the bottom 18 of the tank. Thus the agitator 11 rests on the bottom of basket 9 and is maintained in proper central position within the basket by the vertical spindle 14.

The spindle 14 projects through the tank-bottom 18 and is adapted to be releasably connected to a spur gear 19 by a clutch of which one member 20 is fixed to the spindle 14 and the other member 21 is fixed to the gear 19. Raising and lowering of the spindle 14, and with it the clutch member 20, is accomplished by a shifting fork 22 which projects between the clutch member 20 and a spur gear 23 which is also fixed to the spindle 14 at a slight distance above the clutch member 20. The shifting fork 22 extends beneath the tank bottom 18 to one side thereof and is operated by a rod 24 which is pivoted at 25 to the shifting fork and works in guides 26 secured to the circumferential wall of the tank. The upper end of the rod 24 is provided with a handle 27 and a shoulder 28 on said rod is adapted to engage one of the guides 26 to limit downward motion of the rod 24 and, accordingly, restrict upward movement of the spindle 14. The shifting fork 22 has its fulcrum 29 supported in the wall of the tank 8 beneath the bottom 18.

The gear 19 turns on a supporting frame 30 which is attached to the bottom portion of the tank, a stub shaft 31 being screwed into or otherwise secured to said frame to form the axis for the gear 19.

The gear 19 is turned through an idler gear 32 by another spur gear 33 that turns on a stub shaft 34 screwed into or otherwise secured to the frame 30. Also the idler gear 32 turns on a stub shaft 35 which is screwed into or otherwise secured to the frame 30.

The gear 33 is connected by a hub 36 to a worm gear 37 in mesh with a worm 38 on a worm shaft 39 driven by a pulley 40 on which runs a belt 41 that, in turn, is driven by a pulley 42 on the shaft of a motor 43 which is suitably mounted on the frame 30. It is to be understood that the clutch member 21 may be driven through the agency of any other suitable driving mechanism than that just described, so as to produce rotary motion of the spindle 14.

The spindle may also be oscillated by the provision of a suitable means which, in this instance, is constructed as follows: In this instance, this means is driven off of the worm gear 37 and comprises a rack bar 44 that is pivoted at 45 to the worm gear 37. The rack bar 44 works through a guide 46 so that the path of movement of its teeth, when the worm gear 37 rotates, intersects the path of movement of the gear 23 when the shifting fork 22 is moved into a position to raise the spindle sufficiently to bring the gear 23 opposite to the rack bar.

It is now clear that the spindle 14 may be either rotated or oscillated, according to the position of the clutch member 20.

A means is provided to transmit motion of the spindle 14 to the agitator 11 and, in this instance, this is effected as follows: Secured to the spindle 14 is a clutch member 47 which, when the spindle is raised into its upper position, engages with an internal clutch member 48 formed in the upper end of the stem 13 so that when the clutch members 47, 48 are engaged, oscillation of the spindle 14 will produce oscillation of the agitator.

A suitable means is provided for effecting raising of the basket 9 and, in this instance, this means is constructed as follows: Rotatably mounted on the bearing 15 is a hollow screw 49 of which the thread is external. This screw 49 is turned when the clutch member 47 is in engagement with another clutch member 50 formed in the upper end of said screw 49. The clutch members 48 and 50, in this instance, are in the form of internal spur gears while the clutch member 47 is also in the form of a gear adapted to engage either of the clutch members 48, 50, according to the position of the spindle 14.

Beneath the stem 13 is a nut on which the stem rests, said nut, in this instance, including segmental sections 51 which are pivoted at one end at 52 to the stem 13. As clearly shown in Fig. 5, the nut sections 51 are provided with inwardly projecting flanges 53 which, when the nut sections are closed upon the screw 49, engage beneath shoulders 54 provided on a bearing member 55 that rests on the flange 16. The bearing member 55 constitutes a portion of the bottom of the basket and, accordingly, when the nut sections travel upwardly they carry with them the basket and the agitator, this latter because the agitator rests on the nut sections.

When the basket reaches its upper position, a shoulder 551 at the upper end of the thread of one of the nut sections is engaged by a shoulder 552 (referring to Figure 4a) on the screw 49 thus preventing relative rotation between the nut sections and screw and causing the nut sections and agitator to rotate synchronously with the screw.

Above the shoulder 54 of the nut sections are arcuate grooves 56 (Fig. 7) in the bearing member 55 and, when the nut sections are closed on the screw 49, clutch members 57 on the nut sections engage in the grooves 56 so that rotary motion of the nut will be transmitted to the bearing member 55 and thence to the basket. Thus the members 57 and the bearing member 55, with its grooves 56, constitute clutch means for rotatably connecting the nut with the basket.

A suitable means is provided for operating the nut sections to and from engagement with the screw 49 and, in this instance, said means is constructed as follows: The adjacent edges of the nut sections 51 are provided with grooves 58 and engaging in said grooves is a cam 59 that is mounted on a square cross sectional portion 60 of a shaft 61 which turns in bearings 62, 63 in the stem 13 and which is provided above the upper bearing 63 with a spur pinion 64 that engages an internal gear 65 that is provided with a knurled head 66, said internal gear 65 being rotatably mounted on the upper end of the stem 13. The internal gear is held assembled on the stem and is limited in turning by a screw 67 extending through the internal gear 65 so that the inner end of said screw projects into an arcuate groove 68 in the stem 13, the opposite end walls of the groove 68 constituting shoulders or stops against which the screw 67 strikes when the head 66 is turned sufficiently far in either direction. The amplitude of the movement of the internal gear 65 thus permitted is sufficient to turn the cam 59 through an arc of approximately 90°. Thus when the cam 59 is in the position indicated in Fig. 4, the nut sections 51 will be closed upon the screw 49 by a coil spring 69 which is secured at its opposite ends to the respective nut sections 51 and extends beneath the cam 59. When the cam 59 is turned to a position 90° from that shown in Fig. 4, it spreads the nut sections apart against the tension of the spring 69, thus disengaging the nut from the screw 49. Thus, when the nut is in engagement with the screw 49, if the screw be rotated in the appropriate direction, the nut will ride up the screw near the upper end thereof and will carry the basket and agitator with it.

It is desirable that, when the basket is revolving, any liquid, that may be sprayed on the articles within the basket, in discharging through the openings 10, will not contaminate the liquid bath within the tank 8 and, accordingly, we have provided an annular trough 70 that extends around the inner face of the tank and that is suitably attached thereto. The trough 70, in this instance, is positioned midway of the height of the tank or approximately at the level of the bottom of the basket when the basket is in its raised position. The trough 70 is provided with an outlet 71 that opens through the side of the tank and that, in this instance, communicates with a pipe 72 provided with a valve 73.

If desired, the tank may be mounted on a suitable carriage, such as that indicated by the character 74, said carriage, in this instance, being provided with castors 75 so as to enable the tank to be readily moved from one location to another.

Thus a circular supporting member 76, of angle iron, secured to the carriage 74, supports the lower edge of the tub or tank 8, and a cross member 77 extends diametrically across member 76 for supporting the bottom 18 of the tank and the bearing 15. A nut 78, screwed onto the lower end of bearing 15 maintains the cross member 77 snug against the bottom 18 of the tank.

Assuming, for example, that the articles to be treated in the machine are to be laundered, the device operates as follows: The tank 8 will be supplied with wash water and soap and the articles to be laundered will be placed in the basket 9.

The head 66 will be turned by the operator to a position that will spread apart the nut sections 51. The handle 27 will then be operated to move the clutch member 20 upwardly to free it from the clutch member 21 thus, at the same time, causing the gear 23 to engage the rack bar 44 and the clutch member 47 to engage the clutch member 48.

The motor will now be switched on, thereby causing oscillation of the agitator 11 so as to wash the articles in a manner well understood by those familiar with washing machines provided with this type of agitator. It should be noted that although the basket 9 is free to rotate, it is not fixed to the agitator and the latter can therefore oscillate independently of the basket.

After the agitator has been operated a sufficient length of time to effect cleansing of the articles, the operator will manipulate the handle 27 into a position to cause engagement of the clutch members 20, 21, disengagement of the gear 23 from the rack bar 44, disengagement of the clutch members 47, 48, and engagement of the clutch members 47, 50, thereby effecting rotation of the screw 49. The operator will then turn the head 66 into a position that will effect closing of the nut sections 51 upon the thread of the screw 49, and this results in the nut, and with it the agitator and basket, being raised from the position shown in solid lines of Fig. 2 to the position indicated in broken lines.

As the basket rises, the wash water drains from the articles and from the basket through the openings 10 and when the basket reaches its upper position the shoulders 551, 552 will engage thus causing the stem to rotate the nut; the nut being attached to the agitator, thereby rotates it. When the two nut sections were closed on the screw 49 clutch members 57 on the nut sections also engaged with the grooves 56 in the bearing member 55 attached to the basket so that the basket, as well as the agitator, is turned with the nut. The centrifugal force set up by this rotation forces the wash water out of the articles being laundered and this water passes through the openings in the peripheral wall of the basket and is thrown against the inner face of the upper portion of the tank whence it drains downwardly into the trough 70 which overflows into the tank, the valve 73 being closed. When wash water is no longer being expelled from the articles, the valve 73 will be opened so as to discharge any water that thereafter enters the pipe 72 therefrom, and the articles may then be rinsed by spraying them with clear water while the basket is rotating. The rinse water will be thrown out into the trough 70 and will pass into the pipe 72, and thence to a waste line, not shown.

The articles, after thus being rinsed, may then be removed from the basket and the basket lowered and a fresh supply of articles be placed therein for washing and rinsing by repeating the cycle of operations above described.

To lower the basket, the head 66 will be turned into a position to cause spreading apart of the nut sections 51, thereby disengaging them from the thread of the screw 49, whereupon the basket will descend by its own weight until the bearing member 55 comes to rest on the flange 16. The fall of the basket is cushioned by the water in the tub 8 so that it does not strike the flange 16 with a violent impact.

We claim:

1. A washing machine including a tank, a basket in the tank, an agitator oscillatably and rotatably mounted in the basket, releasable means operable to raise the agitator and basket, a means to oscillate the agitator while the basket is in its lower position, a means driven directly by the basket raising means to rotate the agitator and basket in the upper position, and means to release the basket raising means to allow the basket to descend by gravity from its upper position.

2. A washing machine including a tank, a screw rotatably mounted in the tank, a basket in the tank, an agitator surrounding the screw and oscillatably mounted in the basket, nut sections oscillatably connected with the agitator and enmovably connected with the basket and with the thread of the screw when said sections are closed together, clutch members on the screw and agitator, a third clutch member shiftable alternately into engagement with the first mentioned clutch members, and means operable to either oscillate or rotate the third clutch member.

3. A washing machine including a tank, a screw rotatably mounted in the tank, a basket in the tank, an agitator surrounding the screw and oscillatably mounted in the basket, nut sections hinged to the agitator and engageable with the basket and with the thread of the screw when said sections are closed together, means to operate the nut sections into and out of engagement with said screw, clutch members on the screw and agitator, a third clutch member shiftable alternately into engagement with the first mentioned clutch members, and means operable to either oscillate or rotate the third clutch member.

4. A washing machine including a tank, a screw rotatably mounted in the tank, a basket in the tank, an agitator surrounding the screw and oscillatably mounted in the basket, nut sections connected with the agitator to rotate therewith and engageable with the basket and with the thread of the screw when said sections are closed together, a means to yieldingly hold the nut sections closed on the screw, means to operate the nut sections into open position, clutch members on the screw and agitator, a third clutch member shiftable alternately into engagement with the first mentioned clutch members, and means operable to either oscillate or rotate the third clutch member.

5. A washing machine including a tank, a screw rotatably mounted in the tank, a basket in the tank, an agitator surrounding the screw and oscillatably mounted in the basket, nut sections connected with the agitator to rotate therewith and engageable with the basket and with the thread of the screw when the sections are closed together, clutch members on the screw and on the agitator, a spindle operable up and down within the screw, a clutch member on the spindle adapted when the spindle is raised to engage the clutch member on the agitator and when the spindle is lowered to engage the clutch member on the screw, and means selectively operable to oscillate or rotate the spindle.

6. A washing machine including a tank, a screw rotatably mounted in the tank, a basket in the tank, an agitator surrounding the screw and oscillatably mounted in the basket, nut sections hingedly connected with the agitator and engageable with the basket and with the thread of the screw when said sections are closed together, clutch members on the screw and agitator, a spindle operable up and down within the screw, a clutch member on the spindle adapted when the spindle is raised to engage the clutch member on the agitator and when the spindle is lowered to engage the clutch member on the screw, a fourth clutch member mounted on the spindle, a fifth rotatably mounted clutch member engageable by the fourth clutch member when the spindle is in its lowered position, a means to rotate the fifth clutch member, and a means to oscillate the spindle when the fourth and fifth clutch members are disengaged.

7. A washing machine including a tank, a screw rotatably mounted in the tank, a basket in the tank, an agitator oscillatably mounted in the basket, nut sections movably connected with the agitator and engageable with the basket and with the thread of the screw when said sections are closed together, clutch members on the screw and agitator, a third clutch member shiftable alternately into engagement with the first mentioned clutch members, means operable to either oscillate or rotate the third clutch member, a control member movably mounted on the agitator, means operably connecting the control member with the nut sections for engaging or disengaging said sections with said screw, and means for rotating said screw to raise said nut sections and basket.

8. A washing machine comprising, a tank, a basket in the tank, an agitator oscillatably and rotatably mounted in the basket, a screw concentrically positioned with respect to said basket and agitator, means for rotating said screw, basket raising means comprising a plurality of nut sections adjustable into and out of operative relation with said screw and provided with a clutch member movable into and out of engagement with said basket, a control member mounted on the agitator, and means operably connecting said control member with said clutch member for releasing said nut sections from said screw and said clutch from said basket in response to actuation of said control member to permit the basket and agitator to drop into said tub.

GEORGE A. CREETH.
LESTER P. PHILP.
WALTER A. LINDSAY.